(12) United States Patent
Ancimer et al.

(10) Patent No.: US 6,640,773 B2
(45) Date of Patent: Nov. 4, 2003

(54) METHOD AND APPARATUS FOR GASEOUS FUEL INTRODUCTION AND CONTROLLING COMBUSTION IN AN INTERNAL COMBUSTION ENGINE

(75) Inventors: Richard Ancimer, Vancouver (CA); Sandeep Munshi, Vancouver (CA); Patric Ouellette, Vancouver (CA); Konstantin Tanin, Vancouver (CA); David A. Ruthmansdorfer, Columbus, IN (US)

(73) Assignee: Westport Research Inc., Vancouver (CA)

( * ) Notice: Subject to any disclaimer, the term of this patent is extended or adjusted under 35 U.S.C. 154(b) by 210 days.

(21) Appl. No.: 09/748,547

(22) Filed: Dec. 26, 2000

(65) Prior Publication Data

US 2002/0078918 A1 Jun. 27, 2002

(51) Int. Cl.$^7$ ................................................ F02B 3/00
(52) U.S. Cl. ...................................... 123/299; 123/300
(58) Field of Search .............................. 123/299, 300, 123/429, 430, 431, 434, 435, 436, 676, 681, 687

(56) References Cited

U.S. PATENT DOCUMENTS

| 4,694,802 A | | 9/1987 | Lowi, Jr. ...................... 123/431 |
| 4,768,481 A | | 9/1988 | Wood ........................... 123/254 |
| 5,060,610 A | * | 10/1991 | Paro ............................ 123/300 |
| 5,205,254 A | * | 4/1993 | Ito et al. ...................... 123/305 |
| 5,482,016 A | * | 1/1996 | Ohishi et al. ................. 123/299 |
| 5,832,880 A | | 11/1998 | Dickey .......................... 123/25 |
| 5,875,743 A | | 3/1999 | Dickey .......................... 123/25 |
| 5,996,558 A | | 12/1999 | Ouellette et al. ............ 123/506 |
| 6,032,617 A | * | 3/2000 | Willi et al. ............... 123/27 GE |
| 6,095,102 A | | 8/2000 | Willi et al. .................... 123/27 |
| 6,202,601 B1 | * | 3/2001 | Ouellette et al. ........ 123/27 GE |
| 6,386,177 B2 | * | 5/2002 | Urushihara et al. .......... 123/299 |
| 6,412,469 B1 | * | 7/2002 | Itoyama et al. .............. 123/299 |
| 6,484,689 B1 | * | 11/2002 | Hasegawa ..................... 123/299 |
| 6,491,016 B1 | * | 12/2002 | Buratti ......................... 123/299 |

FOREIGN PATENT DOCUMENTS

| WO | WO 98/10179 | 3/1998 |
| WO | WO 00/28197 | 5/2000 |
| WO | WO 00/28198 | 5/2000 |

OTHER PUBLICATIONS

Thring et al., "The Stratified Charge Glowplug Ignition (SCGI) Engine with Natural Gas Fuel," *SAE Technical Paper Series 911767*, 1991.

Yonetani et al., "Hybrid Combustion Engine With Premixed Gasoline Homogeneous Charge And Ignition By Injected Diesel Fuel—Exhaust Emission Characteristics," *SAE Technical Paper Series 940268*, pp. 1451–1461, Feb., 1994.

(List continued on next page.)

Primary Examiner—John Kwon
(74) Attorney, Agent, or Firm—McAndrews, Held & Malloy, Ltd.

(57) ABSTRACT

A method and apparatus for introducing gaseous fuel into a piston cylinder of an operating internal combustion engine in two separate stages involves monitoring a set of engine parameters, determining engine load and engine speed from the set of engine parameters, in a first stage, introducing a first portion of the gaseous fuel into the cylinder where the first portion of gaseous fuel forms a substantially homogeneous mixture comprising gaseous fuel and air prior to combustion, and in a second stage, occurring sequentially after the first stage, introducing a second portion of the gaseous fuel into the cylinder. The gaseous fuel quantity is variable in response to at least one of engine load and engine speed. Initiation and duration for at least one of the first and second stages is also variable in response to at least one of engine load and engine speed.

54 Claims, 6 Drawing Sheets

OTHER PUBLICATIONS

Suzuki et al., "Exhaust Purification of Diesel Engines by Homogeneous Charge with Compression Ignition Part 1: Experimental Investigation of Combustion and Exhaust Emission Behavior Under Pre–Mixed Homogenous Charge Compression Ignition Method," *SAE Technical Paper Series 970313,* Feb., 1997.

Ishii et al., "Exhaust Purification of Diesel Engines by Homogenous Charge with Compression Ignition Part 2: Analysis of Combustion Phenomena and NOx Formation by Numerical Simulation with Experiment," *SAE Technical Paper Series 970315,* Feb., 1997.

Smith et al., "Modeling of Homogenous Charge Compression Ignition (HCCI) of Methane," *Lawrence Livermore National Laboratory UCRL–JC–127387,* May, 1997.

Christensen et al., "Homogenous Charge Compression Ignition (HCCI) Using Isooctane, Ethanol and Natural Gas—A Comparison with Spark Ignition Operation," *SAE Technical Paper Series 972874,* Oct., 1997.

Suzuki et al., "Combustion Control Method of Homogenous Charge Diesel Engines," *SAE Technical Paper Series 980509,* Feb., 1998.

Christensen et al., "Supercharged Homogenous Charge Compression Ignition," *SAE Technical Paper Series 98087,* Feb., 1998.

Christensen et al., "Influence of Mixture Quality on Homogenous Charge Compression Ignition," *SAE Technical Paper Series 982454,* Oct., 1998.

Christensen et al., "Homogenous Charge Compression Ignition with Water Injection," *SAE Technical Paper Series 1999–01–0182,* Mar., 1999.

Flowers et al., "HCCI in a CFR Engine: Experiments and Detailed Kinetic Modeling," *SAE Technical Paper Series 2000–01–0328,* Mar., 2000.

Chen et al., "Experimental Study of Cl Natural–Gas/DME Homogenous Charge Engine," *SAE Technical Paper Series 2000–01–0329,* Mar., 2000.

Olsson et al., "Experiments and Simulation of a Six–Cylinder Homogenous Charge Compression Ignition (HCCI) Engine," *SAE Technical Paper Series 2000–01–2867,* Oct., 2000.

Martinez–Frias et al., "HCCI Engine Control by Thermal Management," *SAE Technical Paper Series 2000–01–2869,* Oct., 2000.

Kontarakis et al., "Demonstration of HCCI Using a Single Cylinder Four–Stroke SI Engine with Modified Valve Timing," *SAE Technical Paper Series 2000–01–2870,* Oct., 2000.

\* cited by examiner

METHOD AND APPARATUS FOR GASEOUS FUEL INTRODUCTION AND CONTROLLING COMBUSTION IN AN INTERNAL COMBUSTION ENGINE

FIELD OF THE INVENTION

The present invention relates to a method and apparatus for introducing gaseous fuel into the cylinder of an internal combustion engine. More specifically, the present invention relates to a method of, and apparatus for, two-stage injection of gaseous fuel into the engine's cylinder to control the combustion mode of the gaseous fuel introduced in the two stages.

BACKGROUND OF THE INVENTION

The internal combustion engine industry is under ever increasing pressure to reduce pollution to the environment by lowering harmful engine emissions. One response to this pressure has resulted in research into adapting compression ignition (CI) engines (also known as "diesel" engines) to burn natural gas instead of diesel fuel. Compared to diesel fuel, natural gas is a relatively clean burning fuel and the substitution of natural gas for diesel fuel can reduce emission levels of both nitrogen oxides (NOx) and particulate matter (PM). A known technique for substituting natural gas for diesel fuel is called dual fuel operation. In this method, natural gas is mixed with intake air prior to introducing the air/natural gas mixture into the engine cylinder (a process known in the art as fumigation). The mixture is then introduced into the piston cylinder during the intake stroke. During the compression stroke, the pressure and temperature of the mixture are increased. Near the end of the compression stroke, dual fuel engines inject a small quantity of pilot diesel fuel to ignite the mixture of air and natural gas. Combustion is triggered by the auto-ignition of the diesel fuel and it is believed that a propagation combustion mode occurs under these conditions. One advantage of employing a pre-mixed charge of air and natural gas is that the fuel to air ratio can be lean. With fumigation it is possible to realize the advantages of "lean burn" operation, which include lower NOx emissions, lower PM and a potentially higher cycle efficiency.

Known dual fuel methods, however, have at least two disadvantages. One disadvantage is encountered at high load engine operating conditions, when the elevated temperature and pressure in the piston cylinder during the compression stroke makes the air/natural gas mixture susceptible to "knocking". Knocking is the uncontrolled auto-ignition of a premixed fuel/air charge. Knocking leads to a rapid rate of fuel energy release that can damage engines. Measures to reduce the risk of knocking include lowering the compression ratio of the piston stroke or limiting the power and torque output. These measures, however, cause a corresponding reduction in the engine's cycle efficiency (that is, not as much power is available from each piston stroke).

A second disadvantage of known dual fuel methods is that under low load engine operating conditions, the mixture of fuel and air becomes too lean to support stable premixed combustion and results in incomplete combustion or misfiring. The intake air flow can be throttled to maintain a mixture that can sustain premixed combustion, but throttling adversely affects engine efficiency.

A different type of engine that is under development for substituting gaseous fuel for diesel fuel in an internal combustion engine is sometimes referred to as a "high pressure direct injection" (HPDI) engine. Similar to conventional dual fuel engines, which employ the above-described method, HPDI engines burn a large quantity of gaseous fuel, yielding an improvement (over engines burning only diesel fuel) with respect to the emission levels of NOx and PM. In addition, HPDI engines have the potential to achieve the same cycle efficiency, power and torque output as equivalent conventional diesel-fuelled engines. The operational principle underlying HPDI engines is that two fuels are injected under pressure into the engine cylinder near the end of the compression stroke. According to one method, a small quantity of "pilot fuel" (typically diesel) is injected into the cylinder immediately followed by a more substantial quantity of gaseous fuel. The pilot fuel readily ignites at the pressure and temperature within the cylinder at the end of the compression stroke, and the combustion of the pilot fuel initiates the combustion of the gaseous fuel. Accordingly, HPDI engines have little or no pre-mixture of gaseous fuel and air, and thus the gaseous fuel burns in a "diffusion" combustion mode, rather than a premixed combustion mode. In a diffusion combustion mode, the bulk of the combustion is believed to occur in a local near stoichiometric reaction zone. The temperature and resulting NOx formation in a stoichiometric reaction zone are higher than the temperature and resulting NOx formation caused by a lean burn premixed combustion mode. An advantage of HPDI engines over conventional dual fuel mode operation is that they are not susceptible to knocking under high load conditions because the air and gaseous fuel are not pre-mixed and the gaseous fuel is not introduced into the cylinder until after the pilot fuel. Another advantage of HPDI engines is the ability to operate under low load conditions without the need to throttle the engine.

Recently, homogeneous charge compression ignition (HCCI) has been considered as an alternative to the propagation mode of combustion for providing a mode of lean burn pre-mixed combustion. Experimental HCCI engines generally introduce a homogeneous mixture of fuel and air into the engine cylinder(s). Under certain conditions, compression heating of the charge leads to ignition throughout the bulk of the pre-mixed charge without any flame propagation, and this combustion mode is defined herein as HCCI. HCCI is essentially a "controlled knock" condition where the combustion rate is mainly controlled by the chemical reaction kinetics. HCCI is thus distinct from a combustion mode controlled by flame propagation. In a flame propagation combustion mode, when a homogeneous mixture of fuel and air is sufficiently rich to sustain a flame and is ignited at a point, a flame front forms and advances from the ignition point. In a flame propagation combustion mode, the rate of combustion is limited by the transfer of the unburned mixture of fuel and air mixture into the flame reaction zone rather than by the chemical reaction rates.

An advantage of a HCCI combustion mode is that very lean mixtures of fuel and air mixtures can be burned. For example, a fuel/air equivalence ratio of between 0.1 to 0.5 can burn in a HCCI combustion mode, whereas under the same conditions, in a propagation combustion mode combustion would be unstable, leading to misfire or partial burn. With a HCCI combustion mode, under very lean conditions, NOx formation rates can be substantially reduced. Another advantage of a HCCI combustion mode is the potential for the engine to achieve higher cycle efficiencies (relative to a conventional diesel-fuelled engine). With a HCCI engine the rate of combustion is potentially very rapid, resulting in an engine cycle that more closely resembles an ideal cycle. However, a disadvantage of HCCI combustion is the lack of direct control over the start and rate of combustion because only indirect control methods are available. Another disadvantage of HCCI combustion is that at high load conditions, the higher fuel/air ratios result in HCCI combustion rates which may cause engine damage by combusting too rapidly, or by the rate of combustion causing very high in-cylinder pressures. Yet another problem with HCCI engines is the relatively high emissions of unburned hydrocarbons and carbon monoxide.

Because a HCCI combustion mode has the potential to yield substantial reductions in NOx and PM emissions, HCCI combustion modes have been the subject of recent studies and published papers. These publications show that the main control strategies over HCCI mode combustion include: (i) using variable intake manifold temperatures (exhaust gas recirculation (EGR) and intake air heating); (ii) using residual gas trapping; (iii) controlling intake manifold pressure; (iv) controlling premixed charge fuel/air equivalence ratio; (v) controlling fuel type and blend; and (vi) using a variable compression ratio. Extending the operable range for HCCI combustion has been achieved through supercharging, use of EGR to reduce rate of heat release, late injection of diesel fuel, and varying compression ratio. However, none of the investigations into HCCI engine operation have considered the benefits of direct injection of gaseous fuel near top dead centre of the compression stroke, resulting in two separate combustion modes in the same engine cycle.

SUMMARY OF THE INVENTION

A method of introducing gaseous fuel into a cylinder of an operating internal combustion engine, which has a piston disposed within the cylinder, the method comprising:

(a) monitoring a set of engine parameters;

(b) determining engine load and engine speed from the set of engine parameters;

(c) in a first stage, introducing a first gaseous fuel into the cylinder where the first gaseous fuel forms a substantially homogeneous mixture comprising the first gaseous fuel and intake air prior to combustion; and (d) in a second stage, occurring sequentially after the first stage, introducing a second gaseous fuel into the cylinder;

wherein the first and second gaseous fuel quantity is controllable in response to at least one of engine load and engine speed, and at least one of initiation and duration of at least one of the first and second stages is variable in response to at least one of engine load and engine speed. The second stage is preferably initiated when the piston is at or near top dead center.

In a preferred method, within the same engine cycle, the first gaseous fuel combusts according to a pre-mixed combustion mode, and the second gaseous fuel combusts substantially according to a diffusion combustion mode. For improved efficiency and reduced emissions the pre-mixed combustion mode is preferably a homogeneous charge compression ignition mode.

The engine may be a two-stroke engine but is preferably a four-stroke engine to reduce scavenging losses of the air/fuel mixture.

The first stage is initiated so that the first gaseous fuel has time to mix with the intake air to form a homogeneous charge. For example, when the first stage begins during the intake stroke, the first gaseous fuel may be introduced directly into the engine cylinder or into the intake port so that it enters the cylinder with the intake air. When the first gaseous fuel is introduced during the intake stroke, it is preferable for the first stage to begin early in this stroke, for example, at the very beginning of the intake stroke when the piston is at or near top dead centre, to give the first gaseous fuel more time to mix with the intake air. In another preferred method the first gaseous fuel is pre-mixed with intake air prior to being introduced into the cylinder. For example, the first gaseous fuel may be pre-mixed with intake air upstream from a turbocharger or a supercharger.

The set of engine parameters preferably comprises at least one of engine speed, engine throttle position, intake manifold temperature, intake manifold pressure, exhaust gas recirculation flow rate and temperature, air flow into the cylinder, compression ratio, intake and exhaust valve timing and the presence or absence of knocking within the cylinder. Engine speed can be measured directly and is a parameter that is used, for example, to control first and second stage timing. Generally timing is advanced as engine speed increases. Engine throttle position is an indication of engine load, which may be used to control the quantity of the first and second gaseous fuel. Other parameters may be monitored as indicators of the in-cylinder conditions that is preferably controlled to be conducive to combusting the first stage fuel in a HCCI combustion mode.

The timing and fuel quantity of the second stage can be manipulated to influence the in-cylinder conditions in subsequent engine cycles. For example, at least one of second stage gaseous fuel quantity, second stage initiation and/or second stage duration can be varied in response to changes in the value of at least one parameter of the set of engine parameters, to maintain in-cylinder conditions that are conducive to HCCI combustion of the first gaseous fuel. Control of the second stage initiation and/or duration and/or fuel quantity is preferably employed as an additional means for controlling in-cylinder conditions, which may be used in conjunction with more conventional control means such as controlling EGR flow rate or intake air/fuel equivalence ratio. An electronic control unit preferably controls the initiation, duration and quantity of the second gaseous fuel, with reference to a look-up table to determine a plurality of control settings for a given engine load and speed condition.

The second gaseous fuel is preferably employed to supplement the first gaseous fuel when the quantity of first gaseous fuel is knock-limited. This allows the engine to operate at higher load conditions. Accordingly, the quantity of the second gaseous fuel is variable and the quantity increases when the engine load increases.

For turbocharged engines the intake manifold pressure is influenced by exhaust gas pressure and temperature since the exhaust gas drives the turbocharger. Therefore, intake manifold pressure can be controlled, at least in part, by controlling at least one of (a) the quantity of the second gaseous fuel and (b) the time the second gaseous fuel is introduced into the cylinder, since these variables are controllable to change exhaust gas pressure and temperature. For example, when knocking is detected, if intake manifold pressure is increased without increasing first gaseous fuel flow rate, the first stage charge will be leaner and less likely to result in knocking. Accordingly, the initiation, duration and fuel quantity of the second stage can be manipulated to increase intake manifold pressure to reduce intake charge equivalence ratio in subsequent engine cycles when knocking is detected.

For engines that are turbocharged and/or that use exhaust gas recirculation, the exhaust gas temperature has an effect on intake manifold temperature. Accordingly, intake manifold temperature can be influenced in subsequent engine cycles by controlling at least one of:

(a) the quantity of the second gaseous fuel; and
(b) the time the second gaseous fuel is introduced into the cylinder.

Intake manifold temperature has a significant effect on knocking and HCCI combustion. For example, when knocking is detected, a countermeasure to knocking is reducing intake manifold temperature. The second stage initiation, duration and fuel quantity may be used to control intake manifold temperature in conjunction with conventional temperature means, such as, for example, intercoolers and aftercoolers.

In a preferred method the second stage comprises a plurality of fuel injection pulses. A plurality of injection pulses or a shaped injection pulse adds more flexibility. For example, the initiation and/or duration and/or fuel quantity for one pulse can be controlled in response to engine load, and the initiation and/or duration and/or quantity of another pulse can be controlled to influence intake manifold temperature and/or pressure in subsequent engine cycles. That is, the portion of second gaseous fuel that is introduced in a first injection pulse can be increased in response to an increase in engine load. Further, the initiation and/or duration and/or fuel quantity in a second injection pulse is controllable to influence at least one of intake manifold temperature and intake manifold pressure, whereby second injection pulse timing is advanced to reduce intake manifold temperature and/or pressure, and/or fuel quantity is reduced to reduce intake manifold temperature and/or pressure. Intake manifold temperature is preferably reduced when knocking is detected.

The initiation and/or duration and/or fuel quantity for different injection pulses may be independently controlled and at least one of the first and second injection pulses is controlled in response to at least one of engine load and speed. Preferably, the total amount of fuel introduced in the second stage may be determined by the engine load, but the electronic control unit (ECU) may refer to a look-up table to apportion this total amount of fuel between a plurality of injection pulses, with the ECU accounting for the fuel conversion efficiency that corresponds to the timing of the injection pulses.

The method may further comprise introducing a pilot fuel into the cylinder so that it ignites when the piston is at or near top dead centre of the compression stroke. To reduce NOx emissions the pilot fuel injection timing and pilot fuel quantity is controlled to form a substantially lean stratified charge prior to the ignition of the pilot fuel. To form a substantially lean stratified charge, the pilot fuel is preferably introduced into the cylinder when the piston is between 120 and 20 crank angle degrees before top dead center. The timing and amount of gaseous fuel and pilot fuel introduced into the cylinder is preferably electronically controlled.

In addition to other measures that may be taken when knocking is detected, pilot fuel quantity and timing may also be varied when knocking is detected. Whether pilot fuel timing is advanced or delayed in response to detected knocking depends upon several variables, but the ECU preferably determines the appropriate action by referring to a look-up table. Some of these variables include, for example, the current pilot fuel injection initiation, fuel injection duration, engine speed, and current intake manifold temperature and pressure.

Preferred pilot fuels include diesel fuel and dimethylether. The first and second gaseous fuels may be different fuels but they are preferably the same gaseous fuel. However, the gaseous fuel for one of the stages may be premixed with the pilot fuel so that the pilot fuel and gaseous fuel are introduced together. The first gaseous fuel and the second gaseous fuel are preferably selected from the group consisting of natural gas, liquefied petroleum gas, bio-gas, landfill gas, and hydrogen gas.

Instead of employing a pilot fuel, the engine may be equipped with a spark plug or glow plug to initiate combustion of the gaseous fuel.

In a preferred method of introducing fuel into a cylinder of an operating internal combustion engine having a piston disposed within the cylinder, the fuel comprises a main fuel and a pilot fuel that is auto-ignitable to a degree greater than the main fuel. The method comprises introducing fuel into the cylinder in three stages, whereby, (a) a first portion of the main fuel is introduced in a first main fuel stage, timed such that the first portion has sufficient time to mix with intake air so that the first portion burns in a pre-mixed combustion mode;
(b) the pilot fuel is introduced in a pilot stage, such that the pilot fuel auto-ignites when the piston is at or near top dead center; and
(c) a second portion of the main fuel is introduced in a second main fuel stage, such that the second portion burns in a diffusion combustion mode;

wherein the quantity of the first portion of main fuel is controlled to provide a main fuel to air ratio during a compression stroke that is less than a calibrated knocking limit.

In this preferred method the second portion may be introduced in a plurality of injection pulses, with the first of the plurality of injection pulses being timed to ignite with the pilot fuel to assist with the ignition of the first portion of the main fuel. That is, part of the second portion of the main fuel may be ignited to assist with the combustion of the first portion of the main fuel.

The first portion of the main fuel is preferably introduced through an auxiliary injection valve into an air induction passage upstream from the cylinder.

The pilot stage preferably begins during a compression stroke. More specifically, the pilot stage preferably begins when the piston is between 120 and 20 crank angle degrees before top dead center so that the pilot fuel has time to form a substantially lean stratified charge prior to combustion.

The second main fuel stage preferably begins when the piston is at or near top dead centre of a compression stroke.

An apparatus is provided for introducing fuel into the cylinder of an operating internal combustion engine having at least one cylinder with a piston disposed therein. The fuel comprises a main fuel and a pilot fuel that is auto-ignitable to a degree greater than the main fuel. The apparatus comprises:

(a) measuring devices for collecting operational data from the engine, the measuring devices comprising a tachometer for measuring engine speed and a sensor for determining throttle position;
(b) an electronic control unit that receives the operational data and processes the data to compute a set of load conditions, the electronic control unit comprising memory for storing control sets of load conditions and predetermined operating modes for the control sets of load conditions, the electronic control unit matching the computed set of load conditions with the control sets of load conditions to select one of a plurality of predetermined operating modes;
(c) a main fuel injection valve controlled by the electronic control unit to introduce the main fuel into the cylinder at times and in quantities determined by the electronic control unit in accordance with the predetermined operating modes and the set of load conditions; and (d) a pilot fuel injection valve controlled by the electronic control unit to introduce the pilot fuel into the cylinder at times and in quantities determined by the electronic control unit with the predetermined operating modes and the set of load conditions;

wherein the predetermined operating mode comprises a three stage introduction of fuel into the cylinder, whereby a first portion of the main fuel is introduced in a first stage, the pilot fuel is introduced in a second stage and a second portion of the main fuel is introduced in a third stage.

The main fuel injection valve and the pilot fuel injection valve are preferably integrated into a dual fuel injection valve that is operable to inject each one of the main fuel and the pilot fuel independently from the other. An advantage of a dual fuel injection valve is that fewer modifications are required to conventional diesel engines that only have a single fuel injector.

The apparatus may further comprise an auxiliary injection valve associated with an air induction system for introducing the main fuel into an air induction passage. By using an auxiliary injection valve the main fuel may mix with intake air prior to being introduced to the cylinder. The air induction passage may be, for example, an air induction manifold, and is preferably upstream from a turbocharger or supercharger. When the auxiliary injection valve is located in the engine intake port, and the engine comprises a plurality of cylinders, an auxiliary injection valve is provided for each one of the cylinders.

Further advantages for the present dual fuel injection technique will become apparent when considering the drawings in conjunction with the detailed description.

BRIEF DESCRIPTION OF THE DRAWINGS

FIG. 1, which comprises FIG. 1a depicts a portion of the main fuel being injected into the cylinder during the intake stroke, and FIG. 1b depicts the remainder of the main fuel being injected near the beginning of the power stroke.

FIG. 2, which comprises FIG. 2a depicts a portion of the main fuel being injected into the cylinder during the intake stroke, FIG. 2b depicts the injection of a pilot fuel during the compression stroke and FIG. 2c depicts the remainder of the main fuel being injected near top dead centre of the compression stroke.

FIG. 6, which comprises FIG. 6a depicts the rate of heat release curve for lean burn (HCCI mode) and diffusion mode combustion without pilot fuel. FIG. 6b depicts the rate of heat release curve for pilot plume, lean burn (HCCI or flame propagation mode) and diffusion mode combustion with pilot fuel.

DETAILED DESCRIPTION OF PREFERRED EMBODIMENT(S)

In a preferred method, fuel is injected into the cylinder of a four-stroke internal combustion engine having at least one reciprocating piston and a crankshaft associated with the piston. In this disclosure, the position of the piston within the cylinder is described with reference to crank angle degrees before or after top dead center (TDC). The piston is at TDC when the piston has reached the end of an upward stroke and is about to begin a downward stroke (that is, the point when the piston is closest to the cylinder head).

The method involves a main fuel, which is preferably a gaseous fuel such as, for example, natural gas, propane, bio-gas, landfill gas or hydrogen gas. The method may further comprise the use of an ignition source to control the combustion timing of the main fuel. The ignition source may be, for example, a pilot fuel that auto-ignites more readily than the main fuel, a hot surface ignition source, such as a glow plug, a spark plug, or other known ignition device. When a pilot fuel is employed, preferred fuels are conventional diesel or dimethylether.

FIG. 1 illustrates a preferred method of introducing fuel into cylinder 110 in two separate stages. In the embodiment of FIG. 1, the fuel auto-ignites in cylinder 110 with the fuel introduced during the first stage burning substantially in a pre-mixed lean burn combustion mode and the fuel introduced during the second stage burning substantially in a diffusion combustion mode.

Figure 1A:
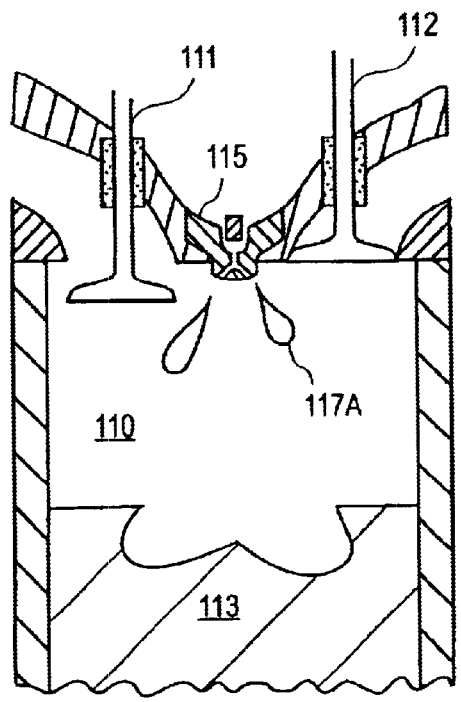
FIGS. 1a and 1b, depicts partial cross-sectional views of an engine cylinder, showing the sequential injection of fuel into the cylinder without pilot fuel.

In the first stage, depicted in FIG. 1a, piston 113 is moving away from injection valve 115 during the intake stroke. Intake air is drawn into cylinder 110 through open intake valve 111. Exhaust valve 112 is closed. In the first stage, main fuel 117a is also introduced into cylinder 110 where it mixes with the intake air. In alternative embodiments (not shown), first stage main fuel introduction may be timed to occur when piston 113 is at bottom dead centre or during the compression stroke, when piston 113 is moving towards injection valve 115 and intake valve 111 is closed. However, delaying first stage main fuel introduction reduces the opportunity for main fuel 117a to mix with the intake air. Accordingly, if the first stage is timed to occur during the compression stroke, it is preferable for it to occur during the early part of the compression stroke, when piston 113 is near bottom dead centre.

The quantity of main fuel introduced during the first stage is limited to reduce the likelihood of knocking. Because the quantity of main fuel introduced during the first stage is limited to very lean conditions (that is, equivalence ratios between 0.10 and 0.50), combustion is expected to occur rapidly via a HCCI combustion mode. Ignition of the pre-mixed charge near top dead centre of the compression stroke results in high thermal efficiencies. Control over the start and rate of pre-mixed combustion is achieved by controlling at least one of intake manifold temperature, intake manifold pressure, EGR rate, EGR temperature, residual gas trapping fraction and compression ratio. In a preferred method, most or all of these parameters are controlled to control the timing of the auto-ignition of the pre-mixed charge via a HCCI combustion mode. Since the pre-mixed fuel and air burns under very lean conditions, the NOx formation rates are very small.

Figure 1B:
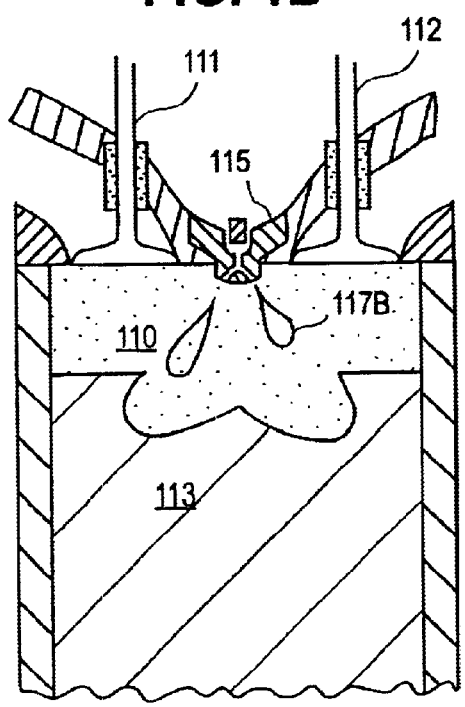

Since the quantity of main fuel introduced in the first stage is limited to prevent knocking, an additional quantity of main fuel is introduced during the second stage to satisfy the engine load requirements. Preferably, the second stage injection of main fuel occurs near top dead centre, as shown in FIG. 1b. In FIG. 1b, piston 113 is moving away from injection valve 115, propelled by the combustion of fuel within cylinder 110. Intake valve 111 and exhaust valve 112 are both closed during the sequential compression and power strokes. Preferably, the second stage occurs late in the compression stroke or during the early part of the power stroke, since introduction of additional fuel late in the power stroke contributes less to engine power output than if it is added earlier. The second stage main fuel introduction is preferably completed before the crankshaft connected to piston 113 has rotated more than 50 degrees beyond the point when piston 113 was at TDC at the beginning of the power stroke.

Because second stage main fuel 117b is introduced near the end of the compression stroke or during the early part of the power stroke, it does not have an opportunity to thoroughly mix with the air in cylinder 110 prior to ignition. Consequently, second stage main fuel 117b burns substantially in a diffusion combustion mode. Since the quantity of first stage main fuel 117a is limited by the engine's knock limit, engine power output is controlled under high load conditions by adjusting the quantity of main fuel 117b introduced during the second stage.

In an engine employing EGR and/or turbocharging, the quantity and/or timing of introducing second stage main fuel 117b is controllable to influence intake manifold temperature and intake manifold pressure in subsequent engine cycles. In a preferred method, the quantity of second stage main fuel 117b is determined primarily by engine load, since the second stage fuel quantity compensates for the fuel shortfall from the first stage imposed by the knock limit. However, the timing of the second stage can be manipulated to contribute to controlling intake manifold temperature and intake manifold pressure. For example, by retarding the introduction of main fuel 117b or increasing the amount of second stage main fuel, the exhaust gas temperature and pressure generally increases. Higher exhaust gas temperature and pressure can be used to increase turbocharger output to increase intake manifold pressure. An intercooler may be employed to add further control to the intake manifold temperature. Exhaust gas temperature may also directly influence intake manifold temperature if the engine uses EGR. In a preferred method, an electronic control unit is used to control the fuel quantity and timing for the second stage main fuel introduction. The electronic control unit receives information on engine load and engine speed (or engine parameters from which the electronic control unit can calculate engine load and speed). The electronic control unit uses this information to determine fuel quantity and timing by referring to a look-up table which contains calibrated values for fuel quantity and timing for given engine operating conditions based upon engine load and speed.

When knocking is detected, one option for preventing further knocking is reducing the amount of main fuel introduced in the first stage and increasing the amount of fuel introduced in the second stage. However, another option for preventing knocking is controlling the timing of the second stage. For example, second stage timing can be retarded to increase intake manifold pressure by boosting the turbocharger output. The higher temperature exhaust gas can be offset by employing an intercooler and/or an aftercooler. Increasing intake manifold pressure in this way results in more air being inducted into the cylinder, thereby forming a leaner homogeneous charge which prevents knocking. Alternatively, second stage timing can be advanced to cool exhaust gas temperature and thus cool intake manifold temperature. An intercooler and/or aftercooler may also be used in combination with advancing the timing of the second stage. Whether the second stage timing is advanced or retarded may depend upon the present timing of the second stage when knocking is detected. This technique of manipulating second stage timing may also be used in combination with reapportioning the fuel quantities that are introduced in the first and second stages.

The electronic control unit may also re-calibrate the look-up table to prevent a recurrence of knocking under the same operating conditions.

In one embodiment main fuel 117b is introduced in a plurality of injection pulses. For example, fuel introduced in a first injection pulse may be employed to satisfy load requirements and fuel introduced in a second injection pulse may be employed to control exhaust gas temperature and pressure which can in turn contribute to controlling intake manifold temperature and/or intake manifold pressure in subsequent engine cycles.

FIG. 2 illustrates another preferred method of introducing a main fuel into cylinder 210 in two separate stages, which further comprises the introduction of a pilot fuel to initiate combustion of the main fuel. Similar to the embodiment of FIG. 1, in the embodiment of FIG. 2, the main fuel introduced during the first stage mixes with the intake air and burns substantially in a homogeneous lean burn combustion mode, and the main fuel introduced during the second stage burns substantially in a diffusion combustion mode.

Figure 2A:
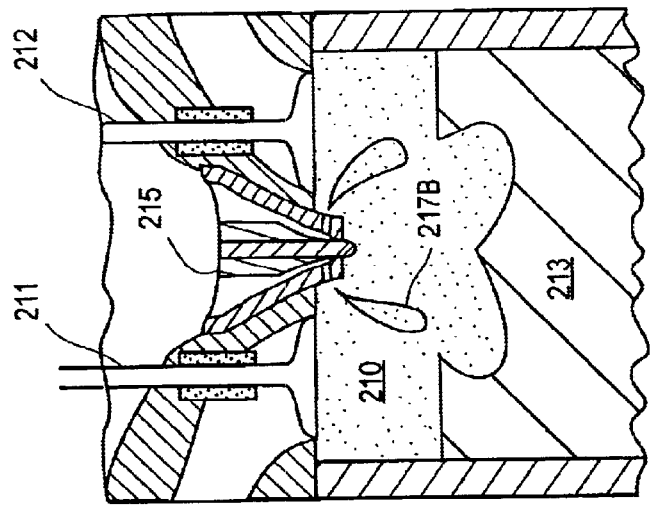
FIGS. 2a, 2b and 2c, depicts partial cross section views of an engine cylinder, showing the sequential injection of fuel into the cylinder with pilot fuel.

FIG. 2a shows the introduction of first stage main fuel 217a into cylinder 210 through injection valve 215 during the intake stroke when intake valve 211 is open and exhaust valve 212 is closed. In FIG. 2a piston 213 is at bottom dead center or moving away from injection valve 215. The method of introducing first stage main fuel 217a is similar to the method of introducing first stage main fuel 117a of the previously described embodiment and all of the alternative methods of introducing the first stage main fuel are also applicable to this embodiment.

Figure 2B:
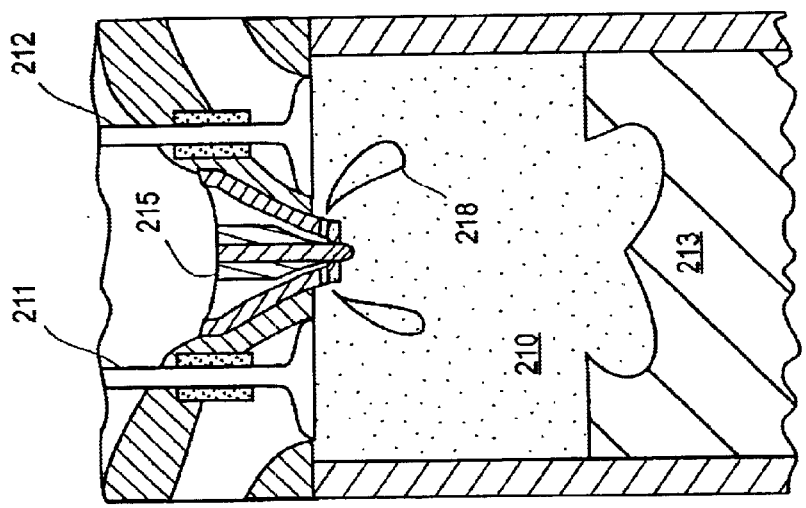

FIG. 2b depicts the introduction of pilot fuel 218 when piston 213 is moving towards injection valve 215 during the compression stroke. Intake valve 211 and exhaust valve 212 are both closed. The amount of pilot fuel 218 and the pilot fuel injection timing are set such that a pre-mixed stratified charge of pilot fuel, main fuel, and air is formed within cylinder 210. In a preferred method the stratified charge is overall lean with respect to the amount of pilot fuel and main fuel within the pilot plume. Preferably, ignition of the stratified charge is coordinated with about the time piston 213 reaches top dead centre of the compression stroke. When the pilot fuel plume ignites, pilot fuel 218 and main fuel trapped within the pilot plume both combust. Since the pilot plume is overall lean, the benefits of lean burn combustion on NOx formation rates are realised in the pilot plume.

In another embodiment, the pilot fuel may be injected into cylinder 210 when piston 213 is near TDC. In this embodiment, the pilot fuel burns substantially in a diffusion combustion mode, which results in higher NOx formation rates. Accordingly, it is preferred to inject the pilot fuel early in the compression stroke as illustrated in FIG. 2b so that a stratified pilot plume forms within cylinder 210. However, pilot fuel 218 must not be injected too early, because this would result in an over-lean stratified charge that does not auto-ignite in a repeatable way from one cycle to the next.

The pilot fuel is preferably introduced into cylinder 210 between 120 and 20 crank angle degrees before TDC. The optimal pilot fuel injection timing may vary with engine speed and load condition. Pilot fuel quantity and timing may also be adjusted if knocking is detected.

Figure 2C:
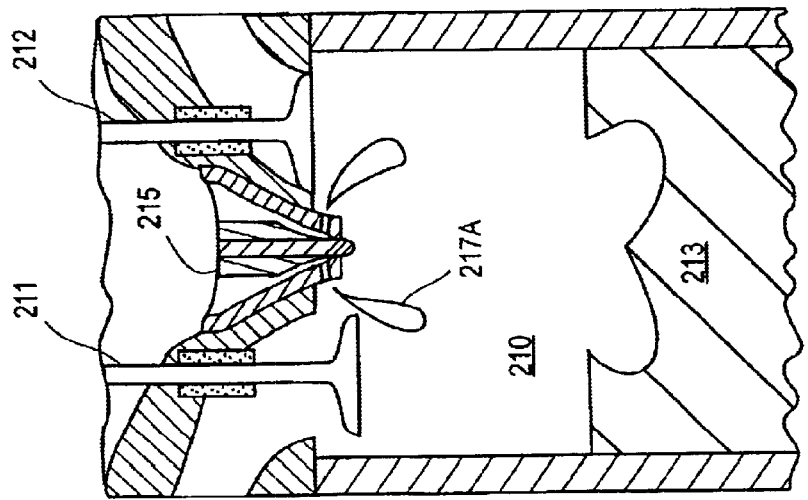

As shown in FIG. 2c, the second stage injection of main fuel 217b occurs when piston 213 is near top dead centre, similar to the previous embodiment shown in FIG. 1b. Because main fuel 217b is introduced at the end of the compression stroke or early in the power stroke, it does not have an opportunity to thoroughly mix with the air in cylinder 210. Accordingly, second stage main fuel 217b burns substantially in a diffusion mode of combustion. Since most of the fuel in the pilot plume and a portion of the pre-mixed charge are burned by the time of the second stage main fuel introduction, injected main fuel 217b mixes with air and significant amounts of combustion products. The NOx formation rates are potentially reduced because of lower oxygen potential.

Since the quantity of first stage fuel 217a is limited by the engine's knock limit, engine power output is controlled under high load conditions by adjusting the quantity of second stage main fuel 217b.

As with the embodiment of FIG. 1, the second stage timing and quantity of second stage fuel 217b can be controlled to influence intake manifold temperature and intake manifold pressure in subsequent engine cycles. Second stage fuel 217b may be injected in a plurality of injection pulses. When a pilot fuel is employed, a portion of second stage fuel 217b may be injected into cylinder 210 so that it combusts with pilot fuel 218 to assist with igniting the homogeneous charge. Similar to the method illustrated in FIG. 1, second stage timing and quantity can be manipulated to influence intake manifold temperature and pressure to prevent knocking or contribute to conditions conducive to HCCI combustion.

Pilot fuel flow rate and injection timing are used in addition to the control parameters discussed in the first embodiment to optimise engine operation in the sense of maintaining high cycle efficiency while keeping NOx and PM levels as low as possible while at the same time preventing the occurrence of knocking. That is, the use of a pilot fuel gives additional control over the start of pre-mixed charge combustion. The control is achieved through compression heating of the pre-mixed charge outside the pilot plume by the expansion of the burned charge in the pilot plume (density ratio of burned to unburned charge is approximately 4). This expansion compresses the unburned premixed charge outside the pilot plume. The compression causes the temperature of the unburned pre-mixed charge to increase, leading to auto-ignition (similar to compression effects leading to end gas ignition in spark ignition engines).

The amount of pilot fuel and premixed fuel/air equivalence ratio together determine the amount of temperature increase. Early injected pilot fuel forms a substantially lean stratified plume within a cylinder filled with pre-mixed fuel and air. The development of the pilot fuel plume is dependent upon pilot fuel injection timing and pilot fuel quantity as well as in-cylinder conditions. Preferably the compression and temperature rise caused by the pilot plume combustion causes the pre-mixed fuel and air to burn in a HCCI combustion mode. Alternatively, it is possible that the temperature increase caused by pilot plume combustion will in turn cause a flame to propagate through the lean pre-mixed charge (however, flame propagation through the pre-mixed charge is not expected since the equivalence ratio of the pre-mixed charge is expected to be too low to sustain flame propagation). In either case, control over the on-set of the pre-mixed charge combustion can be controlled by combusting a stratified pilot fuel plume. The benefits of lean burn combustion in reducing NOx formation rates are realised in either case.

There is the penalty of higher NOx formation in the pilot plume relative to very lean fumigated combustion because the stratified pilot plume is richer (when both main fuel and pilot fuel are considered). When the main fuel is a gaseous fuel such as natural gas or hydrogen, and the pilot fuel is diesel fuel, introducing the second stage of main fuel increases the proportion of main fuel that may be employed to satisfy engine requirements under high load conditions. Increasing the proportion of main fuel reduces the quantity of diesel fuel consumed, thereby reducing NOx emissions. In a preferred embodiment, the quantity of pilot fuel 218 generally represents on average less than about 10% of the total quantity of fuel on an energy basis, with main fuel 217a and 217b providing the balance. At specific operating conditions the quantity of pilot fuel 218 may be higher or lower than 10% of the total fuel quantity.

Figure 3:
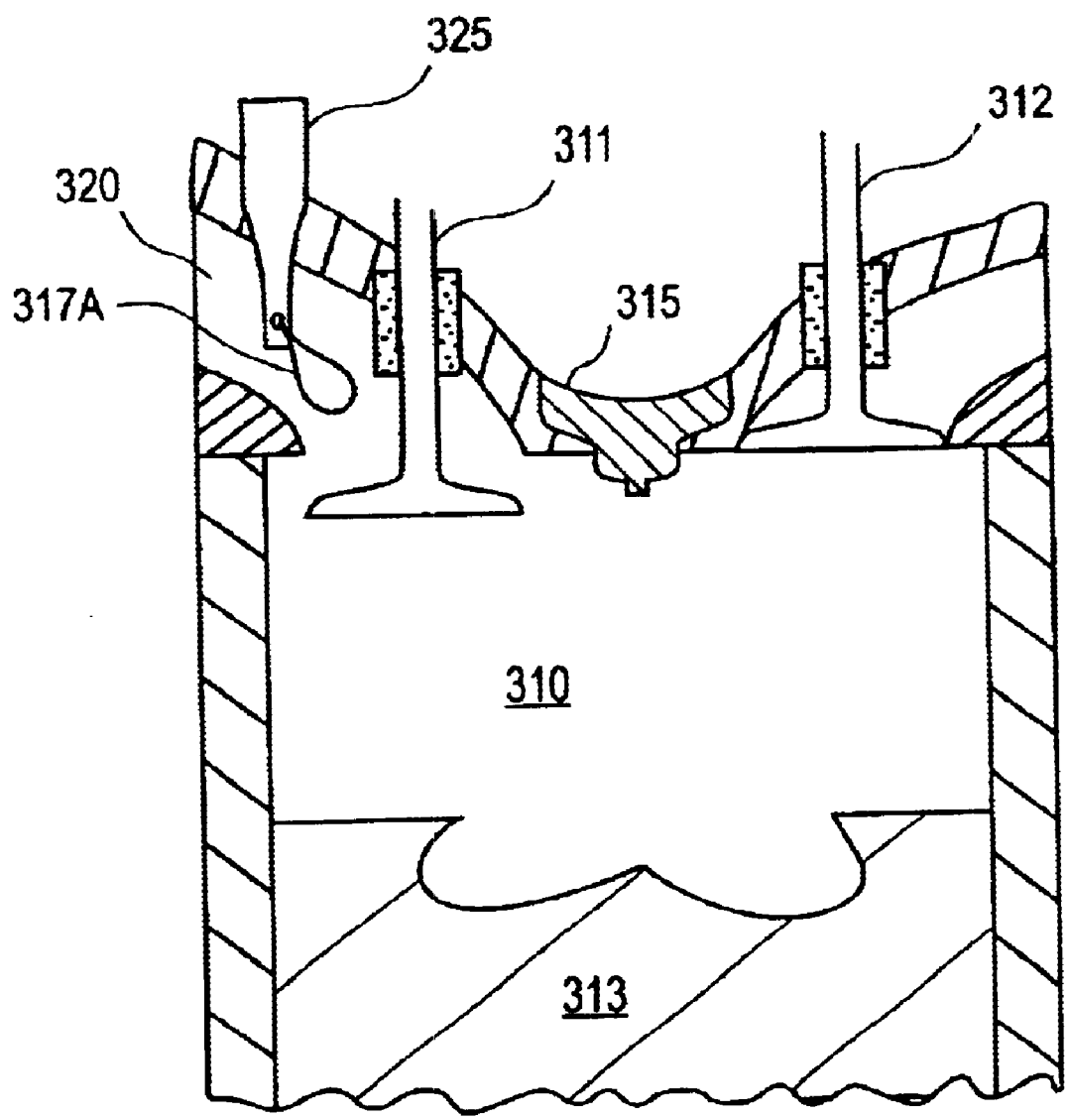
FIG. 3 is a partial cross section view of a cylinder that depicts an alternative arrangement for mixing the main fuel with the intake air. In this arrangement, instead of mixing the main fuel and intake air in the cylinder, they are premixed external to the cylinder (that is, prior to being introduced into the cylinder).

FIG. 3 depicts an alternative arrangement for introducing first stage main fuel 317a into cylinder 310 during the intake stroke. In FIG. 3, intake valve 311 is open and exhaust valve 312 is closed. Piston 313 is moving away from injection valve 315 and drawing a mixture of intake air and first stage main fuel into cylinder 310. Rather than starting to mix gaseous main fuel 317a and air 320 within cylinder 314, auxiliary injection valve 325 introduces main fuel 317a into the air induction system so that main fuel 317a begins mixing with air in induction passage 320 before being drawn into cylinder 310. Induction passage 320 may be, for example, an air intake manifold, or an air intake passage further upstream in the air intake system. Persons skilled in the art will appreciate that auxiliary injection valve 325 may be located, for example, upstream from a turbocharger so that air pressure is lower at the point of injection and the air and fuel have more time to mix together before being introduced into cylinder 310.

Pre-mixing of fuel and air prior to introduction into cylinder 310 gives the mixture more time to become homogeneous before combustion. Intake valve 311 controls the introduction of the pre-mixed charge of fuel and air. In engines that employ only one fuel, the second stage fuel is introduced through injection valve 315, as shown in FIG. 1b. In engines that employ a pilot fuel, injection valve 315 is preferably a dual fuel injection valve that operates like injection valve 215, shown in FIGS. 2b and 2c to introduce pilot fuel and the second stage main fuel.

For engines that comprise a plurality of pistons, a plurality of auxiliary injection valves may be employed, or auxiliary injection valve 325 may be located further upstream in the air induction system to serve all of the pistons.

Figure 4:
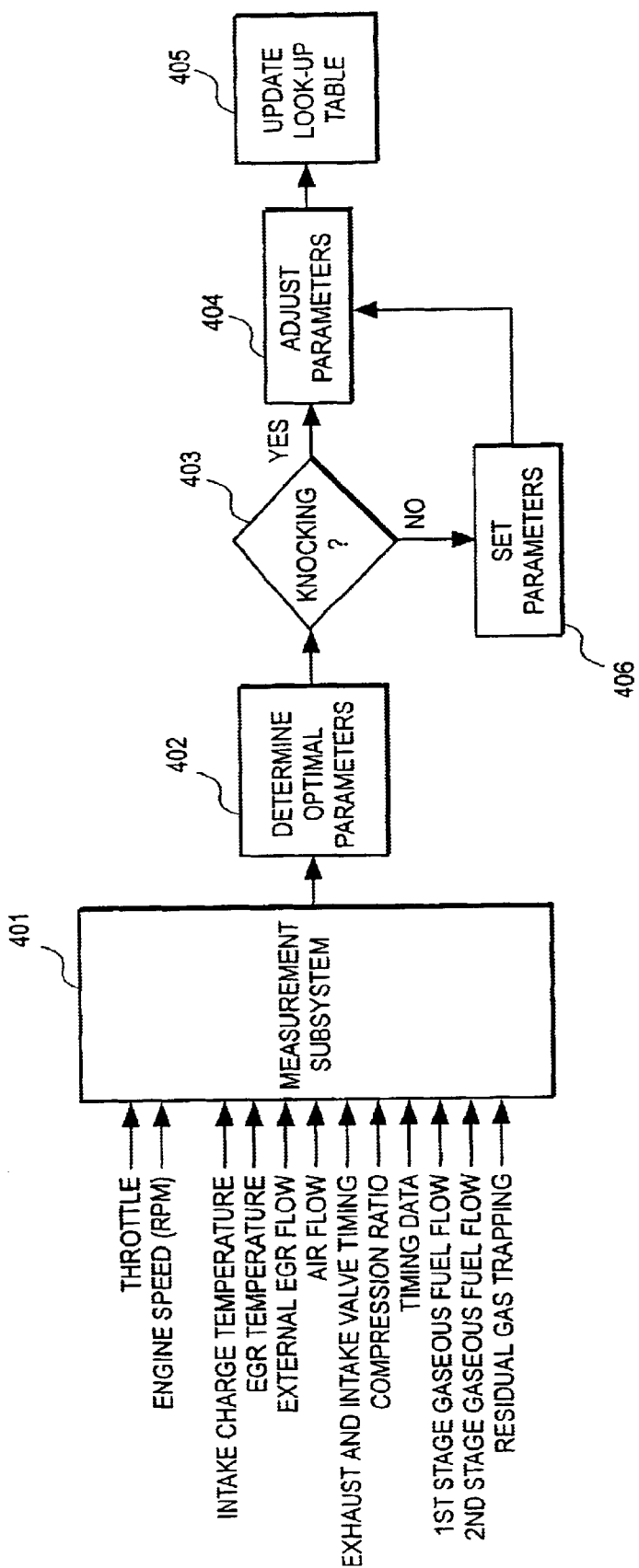
FIGS. 4 and 5 are control logic diagrams that provide an example of the logic that might be employed by an electronic control unit to implement the disclosed method.

FIG. 4 illustrates a control logic diagram that that shows how a measurement subsystem 401 may be used to collect data relating to current operating conditions. In a preferred embodiment, measurement subsystem 401 collects data relating to the throttle position, the engine speed, and other operating parameters, and sends this data to an electronic control unit (ECU). The ECU need not be a separate stand-alone component or unit, but may be integrated with other components such as, for example, engine operational data measuring devices. Measurement subsystem 401 may optionally provide additional data, such as intake manifold temperature; intake manifold pressure; intake air flow; external EGR flow rate; external EGR temperature; exhaust and intake valve timing; compression ratio and information that indicates the occurrence of knocking.

The ECU preferably receives data from measurement subsystem 401 and registers or uses the data to calculate:

(a) the current engine speed;
(b) the current air flow (A);
(c) the current external EGR flow rate and temperature ($T_{EGR}$);
(d) the current intake manifold charge temperature (IMT);
(e) the current residual gas fraction trapping (which may be calculated from exhaust and intake valve timing);
(f) the current compression ratio (CR); and
(g) the current intake manifold pressure (IMP).

At step 402 the ECU determines the desired control parameters by referring, for example, to a look-up table that stores the required information. For example, for a given speed and load condition, the look-up table contains information regarding the optimal intake manifold temperature, intake manifold pressure, compression ratio, residual gas fraction trapping, intake and exhaust valve timing, EGR flow rate, EGR temperature, the amount of main fuel to inject early, and the timing and amount of main fuel to inject in the second stage. Appropriate measures are taken to reach the optimal values. For example, if the EGR flow rate is too low, then the EGR flow rate is increased.

Figure 6A:
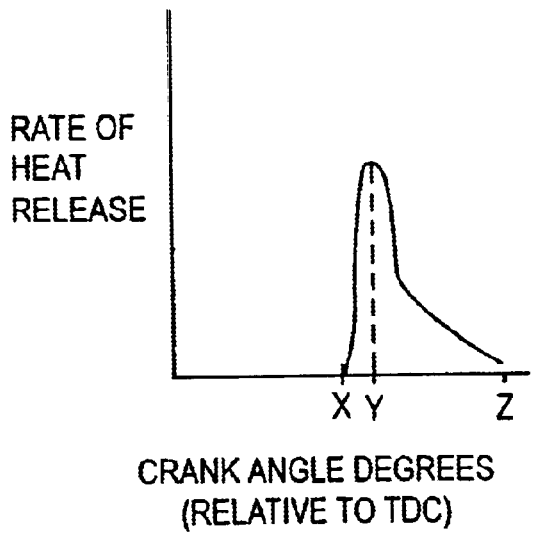
FIGS. 6a and 6b, depicts the rate of heat release curves associated with the HCCI mode and diffusion mode combustion processes.

In the present method, the optimal values of intake manifold temperature, intake manifold pressure, compression ratio, residual gas trapping, intake and exhaust valve timing, EGR flow rate, EGR temperature, and the amount of main fuel injected in the first and second stages are chosen such that engine operation is optimised in the sense of maintaining high cycle efficiency while keeping NOx and PM levels as low possible while at the same time preventing the occurrence of knocking. An example of a rate of heat release curve corresponding to this optimal condition is depicted in FIG. 6a. In this figure, rate of heat release is plotted against crank angle degrees relative to TDC. The main fuel ignites near the beginning of the power stroke, at crank angle degree X, which is at or near TDC. The pre-mixed charge burns rapidly, typically within the first 10–20 crank degrees after top dead centre and peaking at crank angle degree Y. Very little NOx is produced during the combustion of the lean pre-mixed charge. As discussed above, the timing of the on-set of premixed charge combustion is controlled by at least one of intake manifold temperature, amount of main fuel injected early, intake manifold pressure, external EGR rate, residual gas trapping and timing and amount of main fuel injected in the two stages. The fuel/air ratio of the premixed charge is knock and pressure limited (that is, if the fuel/air ratio is too rich, knocking can occur, or maximum in-cylinder pressure limits can be exceeded). The second stage of main fuel injection is timed to occur near TDC of the compression stroke. A portion of the main fuel introduced during the second stage also burns near top dead centre, contributing to the heat released to form the peak at crank angle degree Y. The fuel injected during the second stage burns substantially under diffusion mode combustion. To maintain high cycle efficiency, the injection of the main fuel during the second stage is substantially complete at crank angle degree Z, which is between about 30 to 50 crank degrees after TDC of the compression stroke.

The ECU may also receive data from measurement subsystem 401 that indicates whether or not knocking occurs. If at step 403 the ECU detects knocking, then appropriate control measures are taken at step 404 to adjust parameters to prevent further knocking. For example, the amount of main fuel injected early is reduced, with a corresponding increase in the amount of main fuel injected in the second stage near top dead centre. In addition, or in an alternative measure, based upon predetermined corrective actions set out in a look-up table, the ECU may, for example, elect to do one or more of the following:

(a) reduce the compression ratio;
(b) delay closing the intake valve closing; and
(c) reduce the external EGR rate.

To prevent further occurrences of knocking, at step 405 the ECU may recalibrate its stored values in its memory to recalibrate the value for knock limit.

At step 406 the ECU finally sets the engine operating parameters after taking into account the look up table values determined in step 402 and any adjustments made in step 404. These parameters preferably include one of more of the following:

(a) first stage gaseous fuel flow;
(b) first stage gaseous fuel timing;
(c) intake manifold temperature;
(d) intake manifold pressure;
(e) intake valve timing;
(f) exhaust valve timing;
(g) external EGR flow rate and/or residual gas trapping;
(h) compression ratio;
(i) second stage gaseous fuel quantity; and
(j) second stage gaseous fuel timing.

Figure 5:
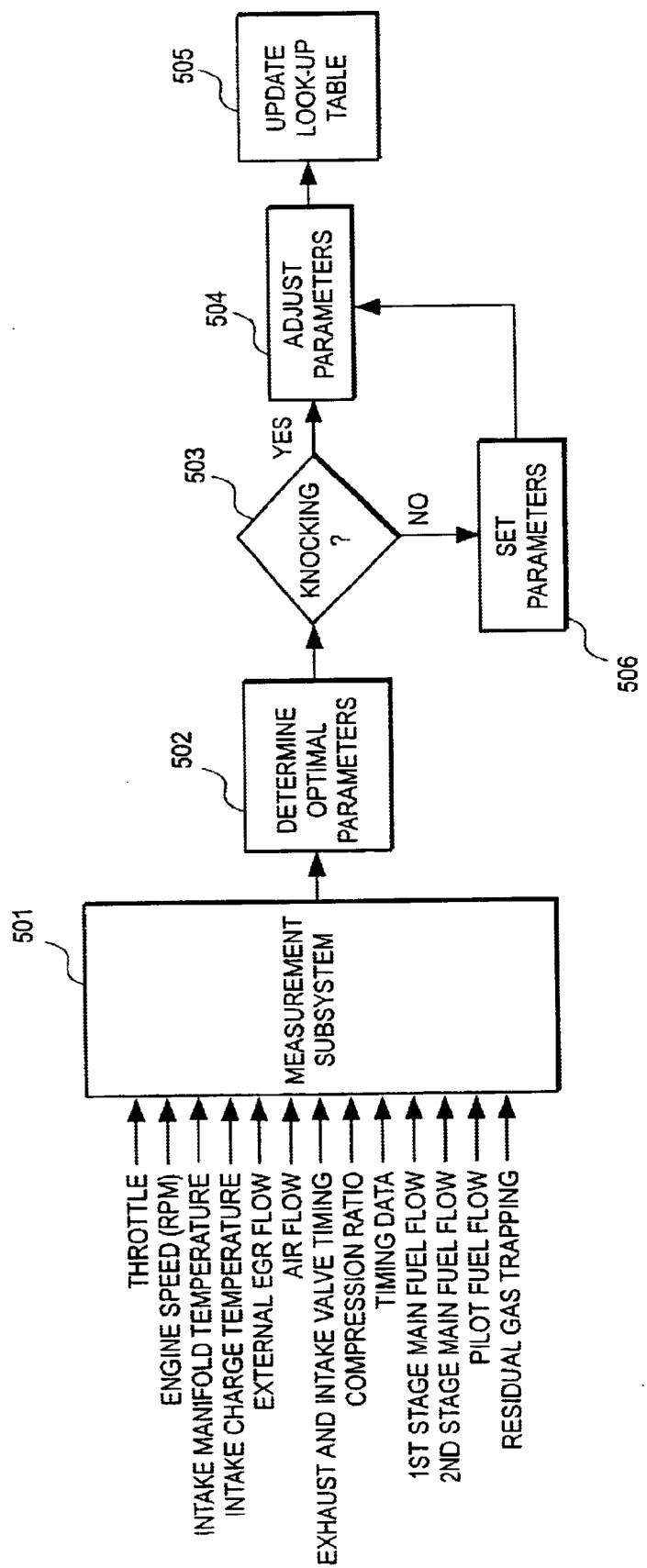

FIG. 5 is a control logic diagram that is similar to the diagram of FIG. 4, except that FIG. 5 is directed to an engine that employs a pilot fuel to initiate combustion of a gaseous main fuel. Accordingly, some of the parameters measured by measurement subsystem 501 are different from the parameters measured by subsystem 401 of FIG. 4. For example, subsystem 501 measures pilot fuel flow but need not measure intake manifold temperature or EGR temperature, since these parameters need not be monitored to control auto-ignition of the gaseous fuel. Steps 502 through 506 are substantially the same as corresponding steps 402 through 406 of FIG. 4, described above.

The disclosed method of introducing main fuel in two separate stages reduces the likelihood of knocking, provides efficient operation by using both lean burn (HCCI) and diffusion modes of combustion, and maintains high engine output while reducing NOx emissions compared to conventional methods of operation.

Figure 6B:
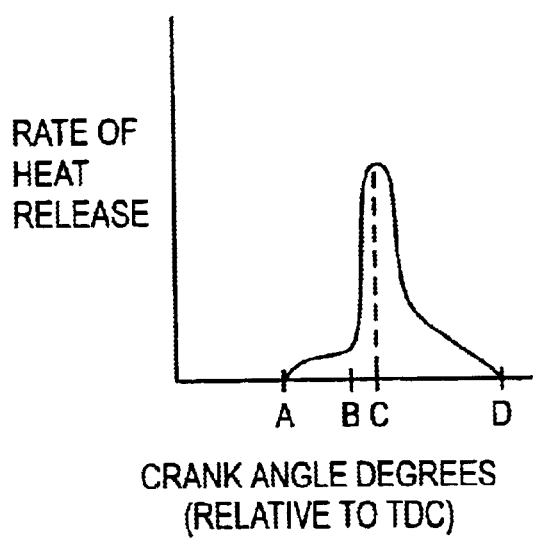

An example of a rate of heat release curve corresponding to the method of FIG. 5 is depicted in FIG. 6b. In this figure, the rate of heat release is plotted against crank angle degrees relative to TDC. The pilot plume combustion begins at crank angle degree A, which is near TDC (preferably within the range of between 20 degrees before or after TDC). The pilot plume continues to burn until crank angle degree B at which point the pre-mixed charge begins to burn rapidly. Substantially all of the pre-mixed charge burns within the first 10–20 crank angle degrees after top dead centre, as shown by the relatively high rate of heat release which peaks after TDC at crank angle degree C. Very little NOx is produced during the combustion of the lean pre-mixed charge. As discussed above, the timing of the on-set of pre-mixed charge combustion is controlled by at least one, and possibly several of the following parameters: intake manifold temperature, amount of main fuel injected early, intake manifold pressure, external EGR rate, residual gas trapping and timing and amount of main and pilot fuels injected in the three stages. The fuel/air ratio of the pre-mixed charge is knock and pressure limited (that is, if the fuel/air ratio is too rich, knocking can occur, or maximum in-cylinder pressure limits can be exceeded). The second stage of main fuel injection is timed to occur near top dead centre of the compression stroke. A portion of the main fuel introduced during the second stage also burns near TDC, contributing to the rate of heat release at crank angle degree C. The fuel injected during this stage, however, burns substantially in a diffusion combustion mode contributing to the portion of the curve between crank angle degrees C and D. Preferably, the injection of the main fuel during the second stage is complete before 30 crank angle degrees after TDC of the compression stroke to maintain high cycle efficiency.

With reference to FIG. 6b, the ECU may also receive data from measurement subsystem 501 that indicates whether or not knocking is occurring. If knocking is detected, then the ECU takes appropriate control measures, as described by steps 503 through 506.

Therefore, the disclosed method of introducing main fuel in two separate stages reduces the likelihood of knocking, provides efficient operation by using stratified charge (pilot plume), lean burn and diffusion modes of combustion all in the same engine cycle, and maintains high engine output while reducing NOx emissions compared to conventional methods of operation.

As used herein, the term "throttle" or "throttle position" has been used in a general sense to convey the load request on the engine. Typically, such a load request is set by the user and may be a foot pedal placement (in the case of a vehicular engine) or a predetermined load request (in the case of an energy generating engine). In general, there are many ways in which a user may set the load request and the term "throttle" (as used in this application) should be understood in this general sense.

While the disclosure describes preferred embodiments of the method and apparatus with reference to a four-stroke engine, those skilled in the art will understand that the same methods may be applied to two-stroke engines. Similarly, while the accompanying figures do not illustrate engines equipped with a glow plug or spark plug to assist with ignition of the fuel, engines equipped with such devices and their respective configurations are well known to those skilled in the art.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of introducing gaseous fuel into a cylinder of an operating internal combustion engine, said engine having a piston disposed within said cylinder, said method comprising:
    (a) monitoring a set of engine parameters;
    (b) determining engine load and engine speed from said set of engine parameters;
    (c) in a first stage, introducing a first gaseous fuel into said cylinder where said first gaseous fuel forms a substantially homogeneous mixture comprising said first gaseous fuel and intake air prior to combustion; and
    (d) in a second stage, occurring sequentially after said first stage, introducing a second gaseous fuel into said cylinder;
wherein said first and second gaseous fuel quantity is controllable in response to at least one of engine load and engine speed, and at least one of initiation and duration of at least one of said first and second stages is variable in response to at least one of engine load and engine speed.

2. The method of claim 1 wherein said second stage is initiated when said piston is at or near top dead center.

3. The method of claim 2 wherein within the same engine cycle, said first gaseous fuel combusts according to a pre-mixed combustion mode and said second gaseous fuel combusts substantially according to a diffusion combustion mode.

4. The method of claim 3 wherein said pre-mixed combustion mode is a homogeneous charge compression ignition mode.

5. The method of claim 1 wherein said engine is a four-stroke engine.

6. The method of claim 1 wherein said first stage begins during the intake stroke.

7. The method of claim 1 wherein said first stage begins when said piston is at or near top dead centre of the intake stroke.

8. The method of claim 1 wherein said first gaseous fuel is pre-mixed with intake air prior to being introduced into said cylinder.

9. The method of claim 8 wherein said first gaseous fuel is pre-mixed with intake air upstream from a turbocharger or a supercharger.

10. The method of claim 1 wherein said set of engine parameters comprises at least one of engine speed, engine throttle position, intake manifold temperature, intake manifold pressure, exhaust gas recirculation flow rate and temperature, air flow into said cylinder, compression ratio, intake and exhaust valve timing and the presence or absence of knocking within said cylinder.

11. The method of claim 10 further comprising changing at least one of second gaseous fuel quantity or second stage timing in response to changes in the value of at least one parameter of said set of engine parameters.

12. The method of claim 11 wherein an electronic control unit controls the timing and quantity of said second gaseous fuel.

13. The method of claim 1 wherein the quantity of said second gaseous fuel is variable and said quantity increases when said engine load increases.

14. The method of claim 13 further comprising turbocharging said engine and controlling intake manifold pressure at least in part by controlling at least one of: (a) the quantity of said second gaseous fuel and (b) the time said second gaseous fuel is introduced into said cylinder.

15. The method of claim 14 further comprising increasing intake manifold pressure to reduce intake charge equivalence ratio when knocking is detected.

16. The method of claim 13 further comprising at least one of turbocharging and recirculating engine exhaust gas to an intake manifold, and influencing intake manifold temperature by controlling at least one of (a) the quantity of said second gaseous fuel and (b) the time said second gaseous fuel is introduced into said cylinder.

17. The method of claim 16 further comprising reducing intake manifold temperature when knocking is detected.

18. The method of claim 13 wherein said second stage comprises a plurality of fuel injection pulses.

19. The method of claim 18 wherein said second stage consists of a first injection pulse and a second injection pulse and said second gaseous fuel is apportioned between said first and second injection pulses.

20. The method of claim 18 wherein the total quantity of said second gaseous fuel is determined in response to engine load requirements with an electronic control unit referring to a look-up table to apportion said second gaseous fuel between said plurality of fuel injection pulses, wherein said electronic control unit accounts for the fuel conversion efficiency that corresponds to the timing of said plurality of injection pulses.

21. The method of claim 19 wherein timing of at least one of said first and second injection pulses is controlled in response to at least one of engine load and speed.

22. The method of claim 19 wherein a first portion quantity of said second gaseous fuel is introduced through said first injection pulse and a second portion quantity of said second gaseous fuel is introduced through said second injection pulse, and said first portion quantity and said second portion quantity are independently controlled in response to at least one of engine load and engine speed.

23. The method of claim 22 wherein said first portion quantity is increased in response to an increase in engine load.

24. The method of claim 22 wherein at least one of second injection pulse timing and said second portion quantity is controlled to influence at least one of intake manifold temperature and intake manifold pressure, whereby reduced by at least one of timing being advanced and fuel quantity being reduced.

25. The method of claim 24 further comprising reducing intake manifold temperature when knocking is detected.

26. The method of claim 24 further comprising increasing intake manifold pressure when knocking is detected.

27. The method of claim 1 further comprising introducing a pilot fuel into the cylinder so that it ignites when said piston is at or near top dead centre of the compression stroke.

28. The method of claim 27 further comprising timing the introduction and amount of said pilot fuel to form a substantially lean stratified charge prior to the ignition of said pilot fuel.

29. The method of claim 28 wherein said pilot fuel is introduced into said cylinder when said piston is between 120 and 20 crank angle degrees before top dead center.

30. The method of claim 27 further comprising electronically controlling the timing and amount of gaseous fuel and pilot fuel introduced into said cylinder.

31. The method of claim 30 further comprising changing at least one of pilot fuel quantity and timing when knocking is detected.

32. The method of claim 27 wherein said pilot fuel is selected from the group consisting of diesel fuel and dimethylether.

33. The method of claim 27 wherein said pilot fuel is mixed with one of said first or second gaseous fuels and introduced into said cylinder together with the gaseous fuel.

34. The method of claim 1 wherein said first and second gaseous fuels are the same gaseous fuel.

35. The method of claim 1 wherein said first gaseous fuel and said second gaseous fuel are selected from the group consisting of natural gas, liquefied petroleum gas, bio-gas, landfill gas, and hydrogen gas.

36. The method of claim 1 further comprising igniting said gaseous fuel using a glow plug or spark plug.

37. A method of introducing fuel into a cylinder of an operating internal combustion engine having a piston disposed within said cylinder, said fuel comprising a main fuel and a pilot fuel that is auto-ignitable to a degree greater than said main fuel, said method comprising introducing fuel into said cylinder in three stages, whereby:

(a) a first portion of said main fuel is introduced in a first main fuel stage, timed such that said first portion has sufficient time to mix with intake air so that said first portion burns in a pre-mixed combustion mode;

(b) said pilot fuel is introduced in a pilot stage, such that said pilot fuel auto-ignites when said piston is at or near top dead center; and (c) a second portion of said main fuel is introduced in a second main fuel stage, such that said second portion burns in a diffusion combustion mode;

wherein the quantity of said first portion of main fuel is controlled to provide a main fuel to air ratio during a compression stroke that is less than a calibrated knocking limit.

38. The method of claim 37 wherein said second portion is introduced in a plurality of injection pulses.

39. The method of claim 38 wherein the first of said plurality of injection pulses begins prior to the beginning of said pilot stage.

40. The method of claim 37 whereby combustion of at least part of said second portion initiates combustion of said first portion.

41. The method of claim 37 wherein said first stage occurs during an intake stroke.

42. The method of claim 37 wherein said first portion of said main fuel is introduced through an auxiliary injection valve into an air induction passage upstream from said cylinder.

43. The method of claim 37 wherein said pilot stage begins during a compression stroke.

44. The method of claim 43 wherein said pilot stage begins when said piston is between 120 and 20 crank angle degrees before top dead center.

45. The method of claim 37 wherein said second main fuel stage begins when said piston is at or near top dead centre of a compression stroke.

46. An apparatus for introducing fuel into the cylinder of an operating internal combustion engine having at least one cylinder with a piston disposed therein, said fuel comprising a main fuel and a pilot fuel that is auto-ignitable to a degree greater than said main fuel, said apparatus comprising:

(a) measuring devices for collecting operational data from said engine, said measuring devices comprising a tachometer for measuring engine speed and a sensor for determining throttle position;

(b) an electronic control unit that receives said operational data and processes said data to compute a set of load conditions, said electronic control unit comprising memory for storing control sets of load conditions and predetermined operating modes for said control sets of load conditions, said electronic control unit matching said computed set of load conditions with said control sets of load conditions to select one of a plurality of predetermined operating modes;

(c) a main fuel injection valve controlled by said electronic control unit to introduce said main fuel into said cylinder at times and in quantities determined by said electronic control unit in accordance with said predetermined operating modes and said set of load conditions; and (d) a pilot fuel injection valve controlled by said electronic control unit to introduce said pilot fuel into said cylinder at times and in quantities determined by said electronic control unit with said predetermined operating modes and said set of load conditions;

wherein said predetermined operating mode comprises a three stage introduction of fuel into said cylinder, whereby a first portion of said main fuel is introduced in a first stage, said pilot fuel is introduced in a second stage and a second portion of said main fuel is introduced in a third stage.

47. The apparatus of claim 46 wherein said main fuel injection valve and said pilot fuel injection valve are integrated into a dual fuel injection valve that is operable to inject each one of said main fuel and said pilot fuel independently from the other.

48. The apparatus of claim 46 further comprising an auxiliary injection valve associated with an air induction system for introducing said main fuel into an air induction passage so that said main fuel may mix with intake air prior to being introduced to said cylinder.

49. The apparatus of claim 48 wherein said air induction passage is an air induction manifold.

50. The apparatus of claim 48 wherein said engine comprises a plurality of cylinders and an auxiliary injection valve for each one of said cylinders.

51. An apparatus for introducing gaseous fuel into the cylinder of an operating internal combustion engine having at least one cylinder with a piston disposed therein, said apparatus comprising:
   (a) measuring devices for collecting operational data from said engine, said measuring devices comprising a tachometer for measuring engine speed, a sensor for determining throttle position, and a sensor for determining temperature within an air intake manifold;
   (b) an electronic control unit that receives said operational data and processes said data to compute a set of load conditions, said electronic control unit comprising memory for storing control sets of load conditions and predetermined operating modes for said control sets of load conditions, said electronic control unit matching said computed set of load conditions with said control sets of load conditions to select one of a plurality of predetermined operating modes;
   (c) means for controlling temperature within said intake manifold, whereby said means is employed to conform temperature within said intake air manifold with a temperature determined by said electronic control unit with reference to said measured operational data and said computed set of load conditions;
   (d) a gaseous fuel injection valve controlled by said electronic control unit to introduce a portion of said gaseous fuel into said cylinder at times when cylinder intake and exhaust valves are closed, and in quantities determined by said electronic control unit in accordance with said predetermined operating modes; and
   (e) an auxiliary gaseous fuel injection valve controlled by said electronic control unit to introduce a portion of said gaseous fuel into an intake air passage to provide a mixture of air and gaseous fuel to said cylinder when said intake valve is open, with said mixture having a fuel to air ratio determined by said electronic control unit based upon said predetermined operating modes;
wherein for given computed load conditions said predetermined operating mode determines timing and quantity of gaseous fuel introduction into said cylinder, whereby a premixed charge of gaseous fuel and air is introduced through said intake valve to combust within said cylinder in a premixed combustion mode, and gaseous fuel is introduced through said gaseous fuel injection valve to combust within said cylinder substantially in a diffusion combustion mode.

52. The apparatus of claim 51 wherein said means for controlling temperature within said intake air manifold comprises a fluid passage connecting an exhaust manifold to said intake air manifold and a control valve for controlling the quantity of exhaust gas flowing through said fluid passage.

53. The apparatus of claim 52 further comprising a heat exchanger associated with said fluid passage to control the temperature of said exhaust gas flowing therethrough.

54. The apparatus of claim 51 further comprising a turbocharger to pressurize said intake air and at least one of an intercooler and an aftercooler.

* * * * *